(12) United States Patent
Naruse et al.

(10) Patent No.: US 8,384,267 B2
(45) Date of Patent: Feb. 26, 2013

(54) ELECTROSTATIC GENERATOR COMPRISING AN ELECTRET FILM

(75) Inventors: Yohko Naruse, Ichinomiya (JP); Makoto Izumi, Gifu (JP); Yoshiki Murayama, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 320 days.

(21) Appl. No.: 12/239,376

(22) Filed: Sep. 26, 2008

(65) Prior Publication Data

US 2009/0079295 A1    Mar. 26, 2009

(30) Foreign Application Priority Data

Sep. 26, 2007 (JP) ................................. 2007-249580

(51) Int. Cl.
*H02N 1/00* (2006.01)
(52) U.S. Cl. ....................... 310/309; 322/2 A
(58) Field of Classification Search .............. 310/309, 310/300; 322/2 A
See application file for complete search history.

(56) References Cited

U.S. PATENT DOCUMENTS

| | | | | |
|---|---|---|---|---|
| 4,127,804 A | * | 11/1978 | Breaux | 322/2 A |
| 4,754,185 A | * | 6/1988 | Gabriel et al. | 310/309 |
| 4,810,673 A | * | 3/1989 | Freeman | 438/386 |
| 5,239,222 A | | 8/1993 | Higuchi et al. | |
| 5,378,954 A | * | 1/1995 | Higuchi et al. | 310/309 |
| 5,552,654 A | * | 9/1996 | Konno et al. | 310/309 |
| 7,182,530 B2 | * | 2/2007 | Takahashi | 396/464 |
| 7,449,811 B2 | * | 11/2008 | Suzuki et al. | 310/309 |
| 7,999,434 B2 | * | 8/2011 | Murayama et al. | 310/309 |
| 8,018,119 B2 | * | 9/2011 | Matsubara et al. | 310/309 |
| 8,053,948 B2 | * | 11/2011 | Suzuki et al. | 310/309 |
| 2009/0079295 A1 | * | 3/2009 | Naruse et al. | 310/300 |
| 2011/0260699 A1 | * | 10/2011 | Nakatsuka et al. | 322/2 R |

FOREIGN PATENT DOCUMENTS

| | | | |
|---|---|---|---|
| JP | 02219478 | * | 9/1990 |
| JP | 02-285978 A | | 11/1990 |
| JP | 06-022563 | * | 1/1994 |
| JP | 07147785 | * | 6/1995 |
| JP | 08-000948 A | | 1/1996 |
| JP | 10225145 | * | 8/1998 |
| JP | 10-271850 | * | 10/1998 |
| JP | 11-215853 | * | 8/1999 |
| JP | 2001-045126 A | | 2/2001 |
| JP | 2001-178153 | * | 6/2001 |
| JP | 2005-529574 A | | 9/2005 |

(Continued)

OTHER PUBLICATIONS

Genda (High Power Electrostatic Motor and Generator using Electrets), 12th international conference on solid state sensors, actuators, and microsystems; Boston, MA; Jun. 2003.*

(Continued)

*Primary Examiner* — Karl Tamai
*Assistant Examiner* — Terrance Kenerly
(74) *Attorney, Agent, or Firm* — Ditthavong Mori & Steiner, P.C.

(57) ABSTRACT

An electrostatic generator includes a substrate, an electrode formed on or in a surface of the substrate, an electret film provided so as to be opposed to the electrode and an insulating film on an electrode side formed on a surface of the electrode on a side opposed to the electret film.

20 Claims, 6 Drawing Sheets

FOREIGN PATENT DOCUMENTS

| | | |
|---|---|---|
| JP | 2007-189722 A | 7/2007 |
| WO | WO 03/105167 A2 | 12/2003 |

OTHER PUBLICATIONS

U.S. Appl. No. 11/215,853, "Carrier Device", Shinji Hayakawa et al., Aug. 6, 1999, Machine Translation.*

2001-178153, "Electrostatic Actuator", Yuji, Aso et al., Jun. 29, 2001.*

Manual Translation of JP 02219478, "Electret Generator", Seiichi Iwamatsu, Sep. 2, 1990.*

Machine Translation of JP 07-147785, Yoshinuma, Hiroto, "Electrostatic Actuator", Jun. 6, 1995.*

Arakawa et al., "The Fourth International Workshop on Micro and Nanotechnology for Power Generation and Energy Conversion Applications Power MEMS 2004", Nov. 28-30, 2004, Kyoto, Japan.*

Japanese Office Action for related Japanese Application No. 2007-249580 dated Mar. 27, 2012, pp. 1-5.

* cited by examiner

ELECTROSTATIC GENERATOR COMPRISING AN ELECTRET FILM

CROSS-REFERENCE TO RELATED APPLICATIONS

The priority application number JP2007-249580, Electrostatic Generator, Sep. 26, 2007, Yohko Naruse, Makoto Izumi, Yoshiki Murayama, upon which this patent application is based is hereby incorporated by reference.

BACKGROUND OF THE INVENTION

1. Field of the Invention

The present invention relates to an electrostatic generator, and more particularly, it relates to an electrostatic generator comprising an electret film.

2. Description of the Background Art

An electrostatic generator comprising an electret film is known in general.

A conventional electrostatic generator is formed by a first substrate, a plurality of electrodes formed on a surface of the first substrate, a second substrate provided so as to be opposed to the electrodes and an electret film made of a resin material such as Teflon (registered trademark), formed on a surface of the second substrate. In this electrostatic generator, a relative position of the electrodes to the electret film is changed, whereby charges induced in the electrodes are changed and the changed charges are outputted as a current.

SUMMARY OF THE INVENTION

An electrostatic generator according to a first aspect of the present invention comprises a substrate, an electrode formed on or in a surface of the substrate, an electret film provided so as to be opposed to the electrode and an insulating film on an electrode side formed on a surface of the electrode on a side opposed to the electret film.

An electrostatic generator according to a second aspect of the present invention comprises a substrate, an electrode formed on a surface of the substrate, an electret film provided so as to be opposed to the electrode, an insulating film on an electrode side formed on a surface of the electrode on a side opposed to the electret film, a conductor layer provided on a surface of the electret film and an insulating film on an electret side provided on the surface of the electret film and a surface of the conductor layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

Figure 2:
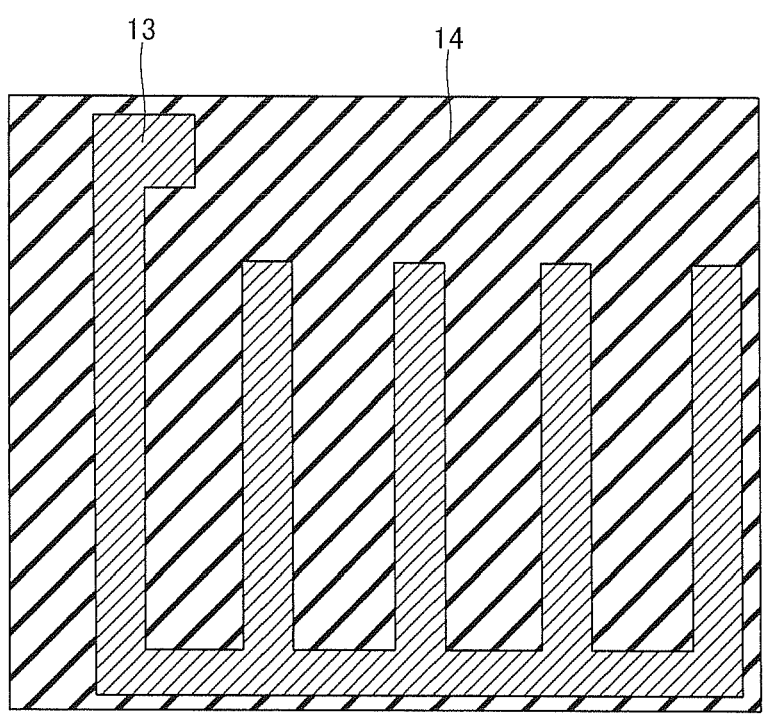
FIG. 2 is a sectional view taken along the line 100-100 in FIG. 1.
Figure 3:
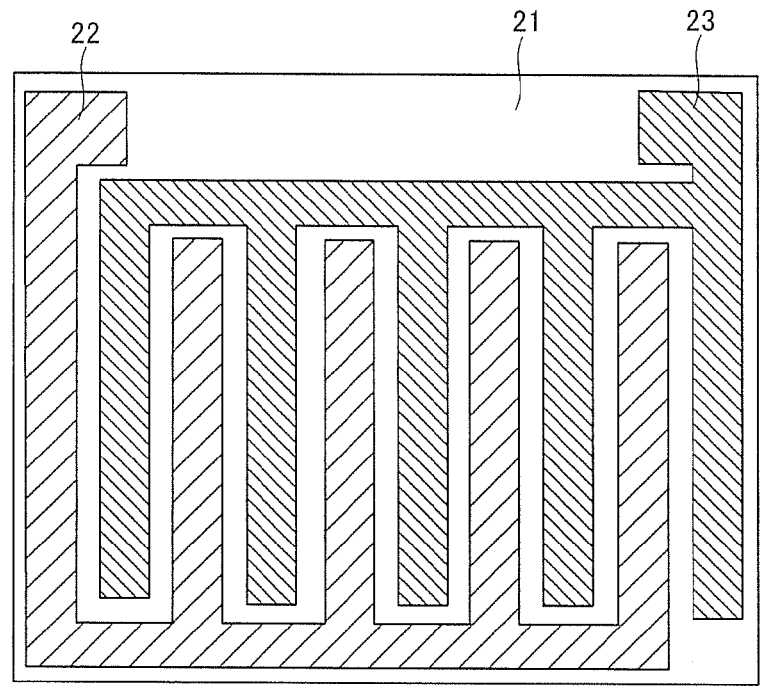
FIG. 3 is a sectional view taken along the line 200-200 in FIG. 1.

A structure of an electrostatic generator 1 according to a first embodiment of the present invention will be described with reference to FIGS. 1 to 3.

Figure 1:
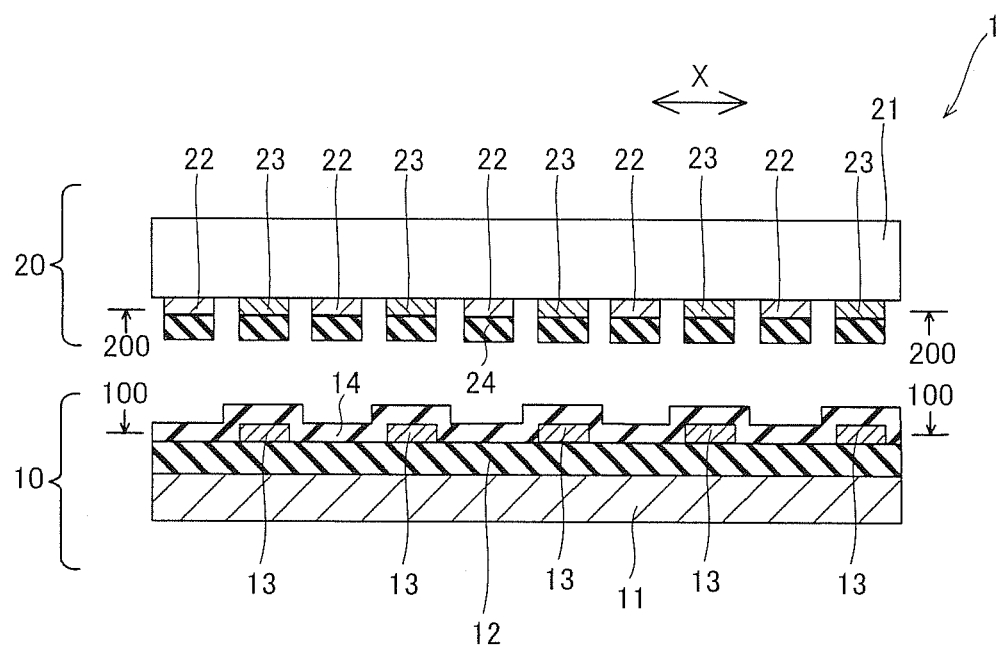
FIG. 1 is a sectional view of an electrostatic generator according to a first embodiment of the present invention.

In the electrostatic generator 1 according to the first embodiment, a first electrode portion 10 and a second electrode portion 20 are so arranged as to be opposed to each other, as shown in FIG. 1. The first embodiment will be hereinafter described in detail.

As shown in FIG. 1, an electret film 12 made of fluororesin such as polytetrafluoroethylene (PTFE) or silicon oxide having a thickness of about 0.1 μm to about 100 μm is formed on a surface of a first conductor layer 11 made of Al having a thickness of about 50 nm to about 1000 nm. The electret film 12 is controlled to a potential of about −20 V to about −2000 V by negative charges injected into an overall surface by corona discharge and entirely distributed therein. A second conductor layer 13 having a thickness of about 50 nm to about 1000 nm is formed on an upper surface of the electret film 12. The second conductor layer 13 is an example of the "conductor layer" in the present invention. The second conductor layer 13 is interdigitally formed as shown in FIG. 2. The second conductor layer 13 is grounded. This second conductor layer 13 has a function as a guard electrode of an electric field by charges stored in the electret film 12. In other words, the electric field on a surface of a region of the electret film 12 provided with no second conductor layer 13 is strong and the electric field on a surface of a region of the electret film 12 provided with the second conductor layer 13 is weak. Thus, the electric field on the surface of the electret film 12 has strong and weak levels.

An insulating film 14 made of MSQ (methyl silsesquioxane), SiOC or SiN is formed on a surface of the second conductor layer 13 and the surface of the electret film 12 provided with no second conductor layer 13. The insulating film 14 is an example of the "insulating film on an electret side" in the present invention. The insulating film 14 has a function of inhibiting charges from flowing out of the surface of the electret film 12.

As shown in FIG. 1, collectors 22 and 23 made of Al having thicknesses of about 50 nm to about 1000 nm are formed on a lower surface of a substrate 21 made of quartz having a thickness of about 300 μm to about 1000 μm. The collectors 22 and 23 are each an example of the "electrode" in the present invention. As shown in FIG. 3, the collectors 22 and 23 are interdigitally formed respectively, and each of teeth forming the interdigital collector 23 is so formed as to be arranged between teeth forming the interdigital collector 22.

According to the first embodiment, insulating films 24 made of silicon oxide ($SiO_2$) or silicon nitride (SiN) are formed on the collectors 22 and 23. The insulating films 24 are each an example of the "insulating film on an electrode side" in the present invention. Vickers hardness (Hv) of each insulating film 24 is preferably at least 500. Thus, abrasion of the insulating films 24 due to dust mixed between the electret film 12 and the collectors 22 and 23 can be suppressed. The insulating films 24 are formed by sputtering or a method of application. Thus, the films can be formed at a room temperature or a relatively low temperature, and hence a substrate made of a material sensitive to a high temperature can be employed. The silicon composition ratio of each insulating film 24 is preferably about 30% to about 40%. Thus, it is possible to suppress reduction of power generation efficiency caused by enhancing the conductivity of the insulating films 24 due to too large silicon composition ratio and causing movement of charges at the time of generating power.

The insulating films 24 are preferably each formed by an insulating film having a dielectric constant larger than 1 and also larger than gas (air, $SF_6$ or the like) filling between the electret film 12 and the collectors 22 and 23.

The relation between a dielectric provided between electrodes and the quantity of power generation will be described with reference to FIGS. 4 to 6.

Figure 4:
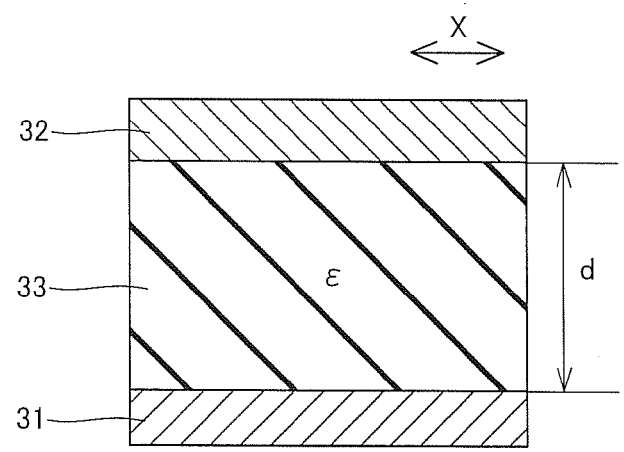
FIG. 4 is a diagram for illustrating the relation between a dielectric provided between electrodes and the quantity of power generation.

As shown in FIG. 4, in a case where a dielectric 33 having a dielectric constant $\in$ is provided between an electrode 31 and an electrode 32, a charge Q stored between the electrode 31 and the electrode 32 is expressed as follows:

$$Q = CV \tag{1}$$

where C represents an electrostatic capacitance, and V represents potential difference between the electrode 31 and the electrode 32. An electrostatic capacitance C is expressed as follows:

$$C = \in_0 \in (S/d) \tag{2}$$

where $\in_0$ represents the dielectric constant of vacuum, $\in$ represents the dielectric constant of the dielectric 33, S represents the surface area of a portion where the electrode 31 and the electrode 32 are opposed to each other, and d represents a distance between the electrode 31 and the electrode 32. The change ΔQ of charges in the case of movement of the electrode 31 or the electrode 32 along arrow X shown in FIG. 4 is expressed as follows:

$$\Delta Q = \in_0 \in (\Delta S/d) V \tag{3}$$

where ΔS represents the change of the surface area S of the portion where the electrode 31 and the electrode 32 are opposed to each other by movement of the electrode 31 and the electrode 32.

Figure 5:
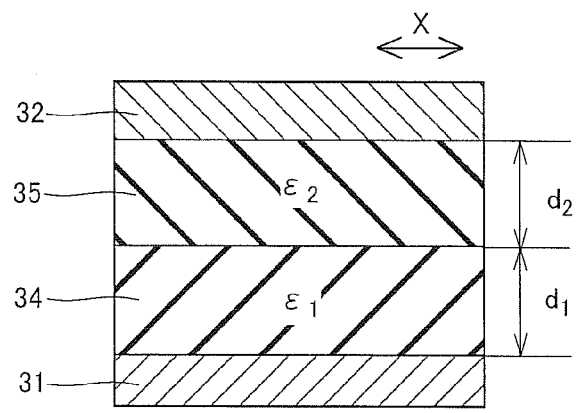
FIGS. 5 and 6 are diagrams for illustrating the relation between dielectrics provided between the electrodes and the quantity of power generation.

As shown in FIG. 5, a dielectric 34 having a dielectric constant $\in_1$ and a dielectric 35 having a dielectric constant $\in_2$ are provided between the electrode 31 and the electrode 32. At this time, the distance d between the electrode 31 and the electrode 32 is expressed as follows:

$$d = d_1 + d_2 \tag{4}$$

where $d_1$ represents the distance from an upper surface of the electrode 31 to a lower surface of the dielectric 35 (thickness of the dielectric 34), and $d_2$ represents the distance from an upper surface of the dielectric 34 to the lower surface of the electrode 32 (thickness of the dielectric 35). In this case, an electrostatic capacitance $C_A$ is expressed as follows:

$$C_A = 1/(1/C_1 + 1/C_2) = \in_0 S(1/((d_1/\in_1) + (d_2/\in_2))) \tag{5}$$

where $C_1$ represents an electrostatic capacitance from the upper surface of the electrode 31 to the lower surface of the dielectric 35, and $C_2$ represents an electrostatic capacitance from the upper surface of the dielectric 34 to the lower surface of the electrode 32. Assuming that change $\Delta Q_A$ of charges in the case of movement of the electrode 31 or the electrode 32 along arrow X shown in FIG. 5 is larger than the change obtained according to the formula (3), the relation of the following formula (6) is satisfied:

$$\in_0 \Delta S(1/((d_1/\in_1) + (d_2/\in_2))) > \in_0 \in (\Delta S/d) \tag{6}$$

Assuming that the material of the dielectric 33 in FIG. 4 is the same as that of the dielectric 34 in FIG. 5 ($\in = \in_1$), the following formula (7) is satisfied:

$$(1/((d_1/\in_1) + (d_2/\in_2))) > \in_1(1/(d_1 + d_2)) \tag{7}$$

In order to satisfy the formula (7), it is understood that the following formula (8) needs to be satisfied:

$$\in_2 > \in_1 \tag{8}$$

This results in $\Delta Q_A > \Delta Q$, and the quantity of power generation is increased.

Figure 6:
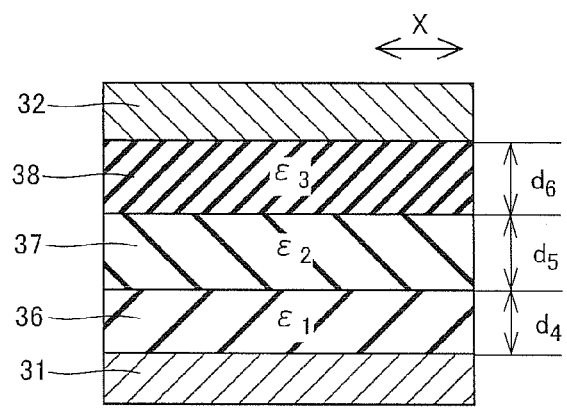

As shown in FIG. 6, a dielectric 36 having a dielectric constant $\in_1$, a dielectric 37 having a dielectric constant $\in_2$ and a dielectric 38 having a dielectric constant $\in_3$ are provided between the electrode 31 and the electrode 32. In this case, assuming that $\Delta Q_B$ represents the change of charges in the case of movement of the electrode 31 or the electrode 32 along arrow X shown in FIG. 6, the following formula (9) is satisfied, thereby resulting in $\Delta Q_B > \Delta Q$:

$$d_5 \in_3 (\in_2 - \in_1) > d_6 \in_2 (\in_1 - \in_3) \tag{9}$$

where $d_5$ represents the distance from an upper surface of the electrode 36 to a lower surface of the dielectric 38 (thickness of the dielectric 37), and $d_6$ represents the distance from an upper surface of the dielectric 37 to the lower surface of the electrode 32 (thickness of the dielectric 38). At this time, the following formulas (10) and (11) are satisfied, thereby the formula (9) is satisfied:

$$\in_2 > \in_1 \tag{10}$$

$$\in_3 > \in_1 \tag{11}$$

The power generating operation of the electrostatic generator 1 according to the first embodiment of the present invention will be now described with reference to FIG. 1.

When no vibration is applied to the electrostatic generator 1, the surface of the electret film 12 provided with no second conductor layer 13 and the collector 22 are opposed to each other at a prescribed interval, as shown in FIG. 1. The surface of the electret film 12 is controlled to the negative potential (about −20 V to about −2000 V), and hence the collector 22 electrostatically induces positive charges. On the other hand, the second conductor layer 13 and the collector 23 are opposed to each other at a prescribed interval.

When horizontal vibration (along arrow X) is applied to the electrostatic generator 1, the first electrode portion 10 and the second electrode portion 20 so relatively move that the collector 22 is opposed to the second conductor layer 13. Thus, the potential opposed to the collector 22 changes from the potential (about −20 V to about −2000 V) of the electret film 12 to the potential (ground potential) of the second conductor layer 13, to change the quantity of the charges electrostatically induced in the collector 22. On the other hand, the collector 23 so moves as to be opposed to the surface of the electret film 12 provided with no second conductor layer 13. Thus, the potential opposed to the collector 23 changes from the potential (ground potential) of the second conductor layer 13 to the potential (about −20 V to about −2000 V) of the electret film 12, and hence positive charges are electrostatically induced in the collector 23. The changed charges are extracted by a circuit connected to the collectors 22 and 23, whereby the electrostatic generator 1 continuously generates power.

According to the first embodiment, as hereinabove described, the insulating films 24 made of silicon oxide ($SiO_2$) or silicon nitride (SiN) are formed on the collectors 22 and 23, whereby the collectors 22 and 23 and the second conductor layer 13 (insulating film 14) are inhibited from coming into contact with each other and hence the collectors 22 and 23 can be inhibited from breakage. Additionally, the insulating films 24 are provided between the first conductor layer 11 and the collectors 22 and 23, whereby the electrostatic capacitance between the first conductor layer 11 and the collectors 22 and 23 can be rendered larger as compared with a case where no insulating film 24 is provided, and hence the quantity of power generated in the electrostatic generator 1 can be increased.

According to the first embodiment, as hereinabove described, the insulating films 24 is made of silicon oxide, whereby the dielectric constant (about 3.5 to about 6.5) of silicon oxide is larger than the dielectric constant (about 1) of air or the like filling between the first conductor layer 11 and the collectors 22 and 23 and hence the quantity of power generated in the electrostatic generator 1 can be rendered larger as compared with a case where no insulating film 24 is formed. Additionally, the insulating films 24 is made of the same material as the substrate 21 made of quartz ($SiO_2$), whereby a warp caused by the difference between the thermal expansion coefficients of the substrate 21 and the insulating films 24 can be suppressed. Thus, reduction in the quantity of power generation due to expansion of the interval between the electret film 12 and the collectors 22 and 23 can be suppressed.

According to the first embodiment, as hereinabove described, the insulating films 24 is made of silicon nitride, whereby the dielectric constant (about 6 to about 9) of silicon nitride is larger than the dielectric constant (about 1) of air or the like filling between the first conductor layer 11 and the collectors 22 and 23 and hence the quantity of power generated in the electrostatic generator 1 can be increased as compared with a case where no insulating film 24 is formed. Additionally, the dielectric constant of silicon nitride is larger than the dielectric constant of silicon oxide and hence the quantity of power generation can be increased as compared with a case where the insulating films 24 are made of silicon oxide.

According to the first embodiment, as hereinabove described, the insulating film 14 made of MSQ, SiOC or SiN is formed on the surfaces of the electret film 12 and the second conductor layer 13. Thus, each of the dielectric constants of MSQ, SiOC and SiN is larger than the dielectric constant (about 1) of air or the like filling between the first conductor layer 11 and the collectors 22 and 23, and hence the quantity of power generated in the electrostatic generator 1 can be increased as compared with a case where no insulating film 14 is formed.

Second Embodiment

Figure 7:
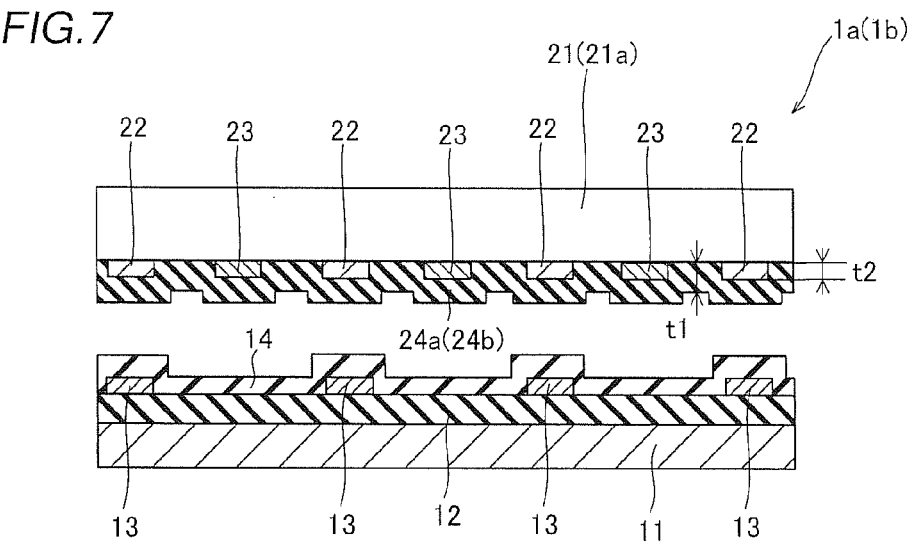
FIG. 7 is a sectional view of an electrostatic generator according to a second embodiment of the present invention.

Referring to FIG. 7, in an electrostatic generator 1a according to a second embodiment, an insulating film 24a is formed also on a surface of a substrate 21 and the substrate 21 and the insulating film 24a contain the same element, dissimilarly to the aforementioned first embodiment.

In the electrostatic generator 1a according to the second embodiment, collectors 22 and 23 made of Al having thicknesses of about 50 nm to about 1000 nm are formed on a lower surface of the substrate 21 made of quartz having a thickness of about 300 μm to about 1000 μm, as shown in FIG. 7.

According to the second embodiment, the insulating film 24a made of silicon oxide ($SiO_2$) or silicon nitride (SiN) is formed on surfaces of the collectors 22 and 23 and the substrate 21. Thus, the electrostatic generator 1a according to the second embodiment is so formed that the substrate 21 made of quartz ($SiO_2$) and the insulating film 24a made of silicon oxide or silicon nitride contain silicon which is the same element. Further, the electrostatic generator 1a according to the second embodiment is so formed that the thickness t1 of the insulating film 24a is not less than the thickness t2 of each of the collectors 22 and 23. Thus, a surface of the insulating film 24a formed on the surface of the substrate 21 provided with no collectors 22 and 23 is aligned with the surfaces of the collectors 22 and 23 or protrudes from the surfaces of the collectors 22 and 23.

The remaining structure of the electrostatic generator 1a according to the second embodiment is similar to that of the electrostatic generator according to the aforementioned first embodiment.

According to the second embodiment, as hereinabove described, the insulating film 24a is formed also on side surfaces of the collectors 22 and 23, whereby an electric field entering the collectors 22 and 23 from the side surfaces of the collectors 22 and 23 pass through the dielectric insulating film 24a and hence the quantity of power generated in the electrostatic generator 1a can be increased.

According to the second embodiment, as hereinabove described, the insulating film 24a is formed also on the surface of the substrate 21, whereby the electric field entering the collectors 22 and 23 partially pass through the insulating film 24a on the dielectric substrate 21 and hence the quantity of power generated in the electrostatic generator 1a can be increased.

According to the second embodiment, as hereinabove described, the substrate 21 and the insulating film 24a contain the same element (silicon), whereby adhesion between the substrate 21 and the insulating film 24a can be easily enhanced.

According to the second embodiment, as hereinabove described, the surface of the insulating film 24a formed on the surface of the substrate 21 provided with no collectors 22 and 23 is aligned with the surfaces of the collectors 22 and 23 or protrudes from the surfaces of the collectors 22 and 23, whereby the thickness t1 of the insulating film 24a is larger than the thickness t2 of each of the collectors 22 and 23 and hence the collectors 22 and 23 can be inhibited from exposure and breakage even when a second conductor layer 13, an insulating film 14 and dust come into contact from the side surfaces of the collectors 22 and 23 and the insulating film 24a are removed. Additionally, the thickness t1 of the insulating film 24a is larger than the thickness t2 of each of the collectors 22 and 23, whereby the quantity of power generated in the electrostatic generator 1a can be increased as compared with a case where the thickness t1 of the insulating film 24a is smaller than the thickness t2 of each of the collectors 22 and 23.

Third Embodiment

Referring to FIG. 7, in an electrostatic generator 1b according to a third embodiment, an insulating film 24b made of organic matter is formed on a surface of a substrate 21a made of resin, dissimilarly to the aforementioned first and second embodiments.

In the electrostatic generator 1b according to the third embodiment, collectors 22 and 23 made of Al having thicknesses of about 50 nm to about 1000 nm are formed on a lower surface of the substrate 21a made of resin such as polyethylene terephthalate (PET) and polycarbonate (PC) having a thickness of about 300 μm to about 1000 μm, as shown in FIG. 7. According to the third embodiment, the insulating film 24b made of polypropylene (PP) or the like is formed on surfaces of the collectors 22 and 23 and the substrate 21.

The remaining structure of the electrostatic generator 1b according to the third embodiment is similar to that of the electrostatic generator according to the aforementioned second embodiment.

According to the third embodiment, as hereinabove described, the substrate 21a is made of resin such as polyethylene terephthalate (PET) and polycarbonate (PC) and the insulating film 24b is formed of an organic insulating film such as polypropylene (PP), whereby the substrate 21a or the insulating film 24b can be easily inhibited from cracking. The substrate 21a and the insulating film 24b are formed by resin and the organic insulating film which are similar materials to each other, whereby adhesion between the substrate 21a and the insulating film 24b can be easily improved.

Although the present invention has been described and illustrated in detail, it is clearly understood that the same is by way of illustration and example only and is not to be taken by way of limitation, the spirit and scope of the present invention being limited only by the terms of the appended claims.

Figure 8:
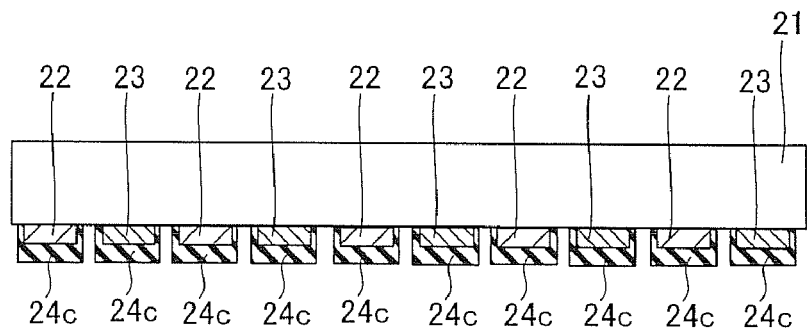
FIG. 8 is a sectional view of an electrostatic generator according to a modification of the first embodiment of the present invention.

For example, while the insulating films 24 are formed on the collectors 22 and 23 in the aforementioned first embodiment, the present invention is not restricted to this but insulating films 24c may be formed so as to cover the collectors 22 and 23 as in a modification shown in FIG. 8.

While the insulating film 14 is formed on the surfaces of the electret film 12 and the second conductor layer 13 in the aforementioned first embodiment, the present invention is not restricted to this but no insulating film 14 may be formed, or the electret film 12 may be located above the second conductor layer 13. In these cases, contact between the electret film 12 and the collectors 22 and 23 or contact between the second conductor layer 13 and the collectors 22 and 23 is suppressed, whereby charges stored in the collectors 22 and 23 can be inhibited from flowing out.

Figure 9:
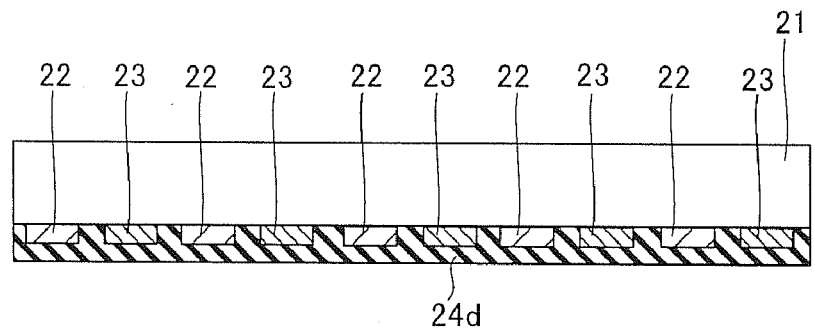
FIG. 9 is a sectional view of an electrostatic generator according to a modification of the second embodiment of the present invention.

While the insulating film 24a having the uneven surface is formed on the substrate 21 and the collectors 22 and 23 in the aforementioned second embodiment, the present invention is not restricted to this but an insulating film 24d having a planar surface may be formed by a method of application as in a modification shown in FIG. 9. Thus, the insulating film 24d and the second conductor layer 13 (insulating film 14) can be inhibited from catching each other. The insulating film 24d is formed to have the planar surface, whereby projecting portions of the insulating film 24d can be inhibited from catching dust or the like and breakage dissimilarly to a case where the surface of the insulating film 24d is uneven.

While the substrate 21a is made of resin such as polyethylene terephthalate (PET) and polycarbonate (PC) in the aforementioned third embodiment, the present invention is not restricted to this but the substrate 21a may be made of resin other than polyethylene terephthalate (PET) and polycarbonate (PC). While the insulating film 24b is formed of the organic insulating film such as polypropylene (PP), the present invention is not restricted to this but the insulating film 24b may be formed of epoxy resin other than polypropylene (PP), an organic film such as polyester or an organic insulating film made of these such as an adhesive tape.

While each of the insulating films formed on the collectors is formed by a single layer in each of the aforementioned first to third embodiments, the present invention is not restricted to this but the insulating film may be formed by two or more layers (see FIG. 6). For example, an $SiO_2$ film may be formed on each collector and an SiN film may be formed on the $SiO_2$ film. The $SiO_2$ film and the SiN film are examples of the "first insulating film" and the "second insulating film" in the present invention. Thus, the quantity of power generation can be further increased.

While the side surfaces of the collectors, the second conductor layer and the insulating film are formed perpendicular to the surface of the substrate in each of the aforementioned first to third embodiments, the present invention is not restricted to this but the side surfaces of the collectors, the second conductor layer and the insulating film may be inclined with respect to the surface of the substrate. Thus, side surfaces of the collectors, the second conductor layer and the insulating film can be inhibited from catching dust and the collectors, the second conductor layer and the insulating film can be inhibited from breakage.

Figure 10:
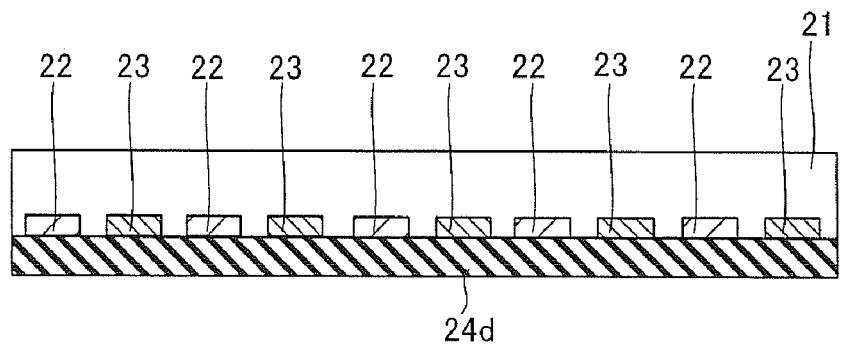
FIG. 10 is a sectional view of a second electrode portion of an electrostatic generator according to a modification of the present invention.
Figure 11:
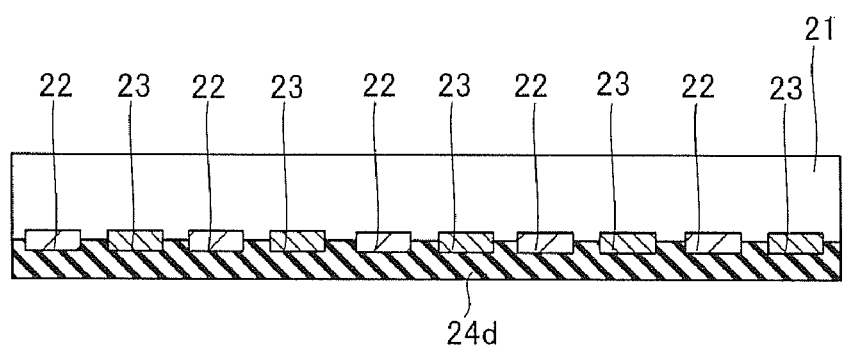
FIG. 11 is a sectional view of a second electrode portion of an electrostatic generator according to a modification of the present invention.
Figure 12:
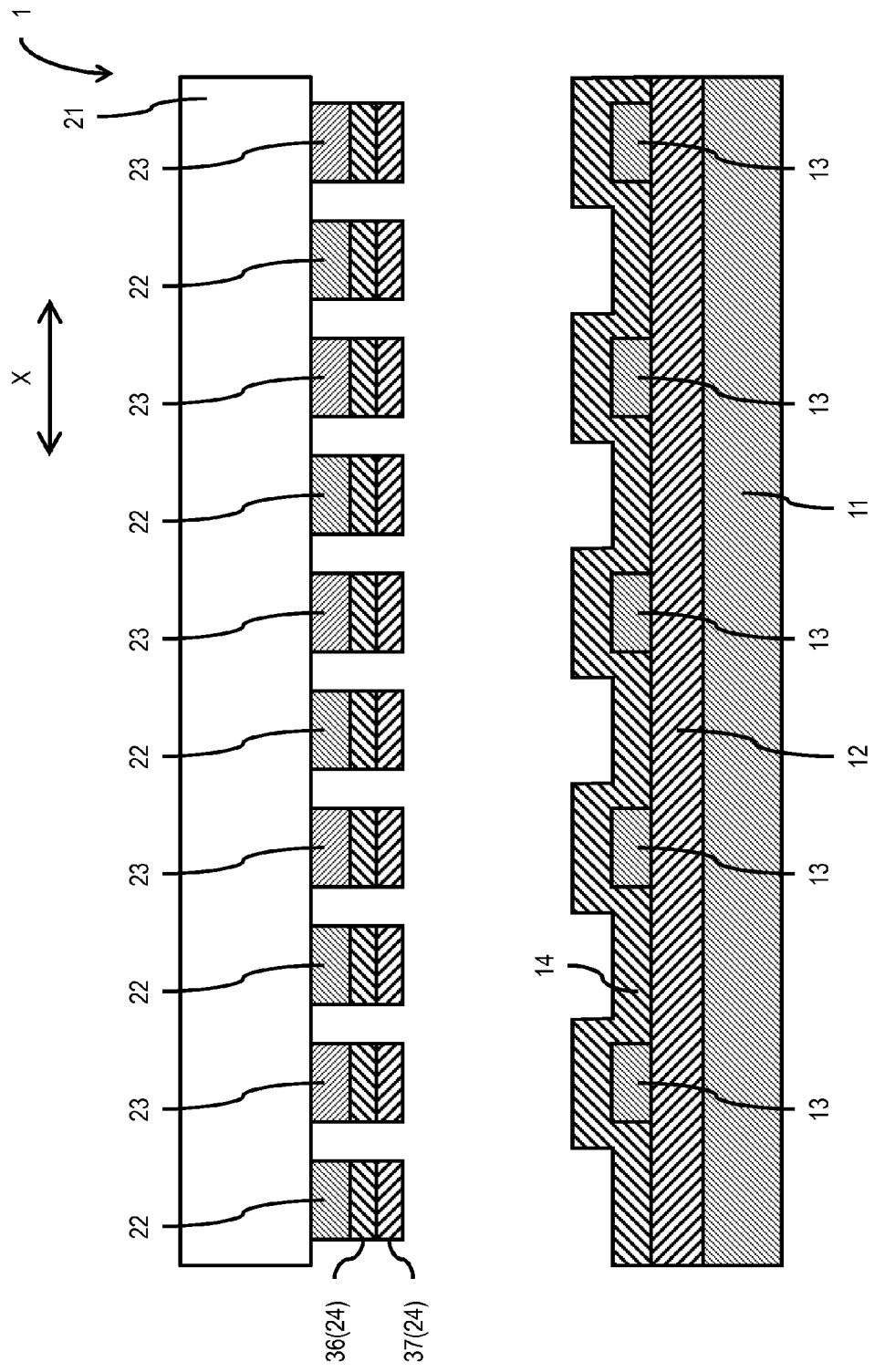
FIG. 12 is a sectional view of an electrostatic generator having an insulating film on an electrode side which includes a first insulating film and a second insulating film.

While the collectors 22 and 23 are formed on the surface of the substrate 21 in each of the aforementioned first to third embodiments, the present invention is not restricted to this but the collectors 22 and 23 may be so formed as to be embedded in the surface of the substrate 21 as shown in FIG. 10. Alternatively, the collectors 22 and 23 may be so formed as to be partially embedded in the surface of the substrate 21 as shown in FIG. 11.

What is claimed is:

1. An electrostatic generator comprising:
    a substrate;
    an electrode formed on or in a surface of said substrate;
    an electret film provided so as to be opposed to said electrode; and
    an insulating film comprising a plurality of insulating film portions formed on a surface of said electrode on a side opposed to said electret film, wherein
    the electrostatic generator comprising the electret film is capable of generating power due to relative linear movement of the electret film and the electrode, and
    said electrode includes a plurality of electrode portions, each electrode portion having an insulating film portion formed thereon, and said plurality of electrode portions are physically formed in an integrated manner, a vacant gap is provided i) between adjacent ones of said plurality of electrode portions and ii) between adjacent insulating film portions; and
    a conductor layer provided on a surface of said electret film, wherein said conductor layer includes a plurality of conductor layer portions and said conductor layer portions are physically formed in an integrated manner.

2. The electrostatic generator according to claim 1, wherein
    said insulating film on the electrode side is formed also on side surfaces of said electrode.

3. The electrostatic generator according to claim 1, wherein
    said insulating film on the electrode side is formed also on said surface of said substrate.

4. The electrostatic generator according to claim 3, wherein
    said substrate and said insulating film on the electrode side contain the same element.

5. The electrostatic generator according to claim 3, wherein
a height of a surface of said insulating film on the electrode side formed on said surface of said substrate from said substrate is not less than a height of said surface of said electrode from said substrate.

6. The electrostatic generator according to claim 5, wherein
said height of said surface of said insulating film on the electrode side formed on said surface of said substrate from said substrate is larger than said height of said surface of said electrode from said substrate.

7. The electrostatic generator according to claim 3, wherein
said insulating film on the electrode side is so formed as to cover said surfaces of said electrode and said substrate.

8. The electrostatic generator according to claim 7, wherein
a surface of said insulating film on the electrode side is substantially planar.

9. The electrostatic generator according to claim 1, wherein
said insulating film on the electrode side is formed by a film having a dielectric constant larger than that of a substance existing between said electrode and said electret film.

10. The electrostatic generator according to claim 9, wherein
a gas having a dielectric constant smaller than that of said insulating film on the electrode side exists between said electrode and said electret film.

11. The electrostatic generator according to claim 9, wherein
the dielectric constant of said insulating film on the electrode side is larger than 1.

12. The electrostatic generator according to claim 1, wherein
said substrate is made of resin and said insulating film on the electrode side is made of an organic insulating film.

13. The electrostatic generator according to claim 1, wherein
Vickers hardness of said insulating film on the electrode side is at least 500.

14. The electrostatic generator according to claim 1, wherein
said insulating film on the electrode side contains silicon, and
a silicon composition ratio of said insulating film on the electrode side is at least 30% and not more than 40%.

15. The electrostatic generator according to claim 1, wherein
said insulating film on the electrode side includes a first insulating film and a second insulating film having different dielectric constants respectively.

16. The electrostatic generator according to claim 1, further comprising a conductor layer provided on a surface of said electret film, wherein
an insulating film on an electret side is formed on said surface of said electret film and a surface of said conductor layer.

17. The electrostatic generator according to claim 16, wherein
said insulating film on the electret side has a function of inhibiting charges from flowing out of said electret film.

18. The electrostatic generator according to claim 16, wherein
a gas exists between said electrode and said electret film, and
said insulating film on the electret side is formed by a film having a dielectric constant larger than that of said gas existing between said electrode and said electret film.

19. The electrostatic generator according to claim 16, wherein
a dielectric constant of said insulating film on the electret side is larger than 1.

20. The electrostatic generator comprising an electret film according to claim 1, further comprising a conductor layer provided on a surface of said electret film, wherein
an insulating film on an electret side is formed on said surface of said electret film and a surface of said conductor layer, and
said insulating film on said electret side has a step portion reflecting a shape of said conductor layer which extends both in a movement direction of said substrate and in a direction substantially perpendicular to said movement direction of said substrate.

* * * * *